US006068391A

United States Patent [19]

Saladin et al.

[11] Patent Number: 6,068,391

[45] Date of Patent: May 30, 2000

[54] HEADLIGHT WITH A TWIN FILAMENT LAMP FOR PRODUCING A CHOPPED BEAM AND AN UNCHOPPED BEAM

[75] Inventors: Denis Saladin, Bourg-La-Reine; Jean-Marie Brel, Claye Souilly, both of France

[73] Assignee: Valeo Vision, Bobigny, France

[21] Appl. No.: 09/025,918

[22] Filed: Feb. 19, 1998

[30] Foreign Application Priority Data

Feb. 21, 1997 [FR] France .................................. 97.02098

[51] Int. Cl.[7] ...................................................... B60Q 1/00

[52] U.S. Cl. .......................... 362/516; 362/211; 362/214; 362/538; 362/539

[58] Field of Search .................................... 362/487, 211, 362/214, 516, 538, 539

[56] References Cited

U.S. PATENT DOCUMENTS

| | | | |
|---|---|---|---|
| 4,945,454 | 7/1990 | Bunse et al. | 362/61 |
| 5,111,368 | 5/1992 | Suzuki et al. | 362/61 |
| 5,171,082 | 12/1992 | Watanabe . | |
| 5,544,021 | 8/1996 | Lopez et al. | 362/61 |
| 5,651,610 | 7/1997 | Fadel . | |

FOREIGN PATENT DOCUMENTS

| | | | |
|---|---|---|---|
| 0 736 726 | 4/1996 | European Pat. Off. . | |
| 0 581 679 A1 | 7/1993 | France | 362/61 |
| 2 720 476 | 12/1995 | France . | |
| 43 07 110 | 9/1994 | Germany . | |
| 2 275 764 | 9/1994 | United Kingdom . | |

OTHER PUBLICATIONS

French Search Report dated Nov. 1997.

*Primary Examiner*—Sandra O'Shea
*Assistant Examiner*—John A Ward
*Attorney, Agent, or Firm*—Morgan & Finnegan

[57] ABSTRACT

A motor vehicle headlamp has a lamp with two filaments, one of which has a masking screen so as to form a chopped or dipped beam, while the other filament is unmasked so as to produce an unchopped beam. The headlight also includes a reflector and a smooth cover lens.

The reflector has an upper zone extending between two radial half planes which are inclined by the same amount below the horizontal, this upper zone being larger than the part of the reflector which is exposed to the first filament; the reflector has two lateral sub-zones with base surfaces which are symmetrical with respect to the vertical, with striations being formed by projection on the base surface, the striations being configured according to the particular type of chopped beam required. The reflector also has a second zone having a surface for cooperation with the second filament only, so as to form a wide portion of the beam and extending at least partly above the cut-off of the dipped beam.

19 Claims, 5 Drawing Sheets

HEADLIGHT WITH A TWIN FILAMENT LAMP FOR PRODUCING A CHOPPED BEAM AND AN UNCHOPPED BEAM

FIELD OF THE INVENTION

The present invention relates in general terms to motor vehicle headlights. More particularly, the invention relates to a headlight with a light source having two filaments, which are typically incorporated in a single lamp, and in which one of the filaments is associated with means for restricting the field of illumination given by that filament, typically in the form of a masking screen. This mask restricts the field of emission of light from this first filament by the headlight. The beam emitted by the headlight from this second filament is therefore a chopped beam, which may typically consist of a dipped beam but which may be selected among various types of chopped beam. The other filament has no masking means, and produces an unchopped beam such as a headlight main beam.

BACKGROUND OF THE INVENTION

Such a light source, such as a lamp, is generally associated with a parabolic reflector, the focus of which is located between the two filaments of the lamp. The headlight further includes a cover lens which has sets of prisms and/or striations such as to spread the beam generally horizontally and along the inclined part of the cut-off of the dipped beam, so as to give comfortable lighting and also to satisfy the photometric requirements laid down in regulations.

In addition, Valeo Vision S.A. has for a number of years been developing reflectors which, associated with filaments that have no masking screen, generates beams such as a European type dipped beam, which not only provide a precise V-shaped cut-off, but which also give good lateral spread of the light. In that case, the cover lens may be smooth or nearly smooth, which is of advantage, not only as regards its selling costs, but also from the aesthetic point of view. One headlight of that type is described in French patent specification No. FR 2 664 677A in particular.

Given the foregoing, the purpose of this type of reflective surface is, as has been indicated above, to cooperate with a filament having no masking screen, and has been considered a priori as being of no interest where the filament does have a screen for making the cut-off. Now, twin filament lamps, in which one filament is associated with a screen, and more particularly the so-called "H4" normalised lamps, continue to be widely used, mainly in headlights which have both a main beam and a dipped beam function.

It is also known, from French patent specification No. FR 2 720 476A in the name of Valeo Vision S.A., to use mathematically defined surfaces such as are cited above, with a lamp of the H4 type or equivalent, to obtain better quality beams. The headlights described in that document do however have certain limitations. In particular, if it is required to make, in accordance with the descriptions in that patent, headlights which are adapted for use under different regulations, and in particular a headlight with main and dipped beam functions in which the dipped beam is a normalised European beam for driving on the right, or a headlight with main and dipped beam functions in which the dipped beam is a normalised European beam for driving on the left, or again, a headlight with main and dipped beam functions in which the dipped beam will satisfy regulations in the United States of America, then all the various reflectors have to be made each time not only with different formers in the mould (i.e. the core, or male member, which cooperates with the mould cavity to produce the moulded reflector), but the mould cavities themselves also have to be different.

This is explained by the fact that the base surfaces from which the various reflectors are made differ quite radically from each other, and the use of a common mould cavity would lead to major variations in thickness of the reflector, leading to high consumption of moulding material and to risks of mechanical instability at high temperatures.

It is true that European patent specification No. EP 0 736 726A proposes a headlight capable of generating a chopped beam, in which the same mould cavity can be used whether the reflector is to be used for driving on the left or driving on the right. However, the disclosures in that European patent document do not enable a headlight with both main beam and dipped beam facilities to be made with the same advantages. In particular, nothing is said about the positioning of the masking screen.

DISCUSSION OF THE INVENTION

A first object of the present invention is to provide a headlamp capable of generating two types of beam, with its reflector being able to be moulded using the same mould cavity regardless of which side of the road a vehicle incorporating the headlight is to be driven on.

A further object of the invention is to provide a headlight in which its reflector can be moulded using the same former or male member of the mould, regardless of whether the headlight is intended for a vehicle of right drive or left hand drive.

Yet another object of the invention is to provide a headlight in which its reflector can be moulded with the same male member for producing a dipped beam which is compatible both with European regulations and with the regulations of the United States of America.

According to the present invention, a motor vehicle headlight of the type including a lamp having two filaments, the first of which is arranged to form a chopped beam, a masking screen being associated with it for that purpose, so as to limit the emission of light to a given angular field, the second filament being arranged to form a beam which is not chopped, and to emit light freely around the filament, together with a reflector and a cover lens which is essentially smooth or with no substantial deflecting capability, is characterised in that the reflector comprises:

a first zone, extending in the upper part of the mirror between two transition half planes passing close to the optical axis of the reflector and inclined by the same amount below a horizontal plane, the said first zone having an angular field covering the angular field of emission of the first filament and overlapping beyond the latter, the said first zone comprising two lateral sub-zones which have two respective base surfaces that are symmetrical with respect to a vertical plane passing through the optical axis of the reflector, and the reflective surfaces of the said lateral sub-zones being obtained by projection of striations on the said base surfaces, in such a way as to generate two components of the chopped beam, the said striations being determined according to a particular type of chopped beam to be generated, and a second zone in the remaining part of the reflector, the said second zone having a surface adapted to cooperate with the second filament only, and being adapted to generate a part of the beam which is wide and extends at least partly above the cut-off of the chopped beam.

According to a preferred feature of the invention, the first zone of the reflector further includes a central sub-zone which is sub-divided into a plurality of elementary regions, each of which has a horizontal axial cross section which is not focussed on the second filament, the said elementary regions being joined to each other with break of slope along their intersections. In that case, preferably, the central sub-zone and the lateral sub-zones of the first zone are joined together with zero order continuity.

According to another preferred feature of the invention, the base surfaces of the lateral sub-zones of the first zone are part of a common paraboloid of revolution, the axis of which is coincident with the optical axis of the reflector. In preferred embodiments of this arrangement, the said paraboloid of revolution is focussed on a point which is situated immediately in front of the first filament; and/or the striations projected on the base surfaces of the two lateral sub-zones include, in each lateral sub-zone, a first set of essentially vertical rectilinear striations for spreading the light horizontally, and a second set of striations which extend below the first striations and along circular trajectories which are centred in the vicinity of the optical axis of the reflector.

In preferred embodiments having any or all of the features set out in the last paragraph, the masking screen associated with the first filament defines an angular emission field contained between a first cut-off half plane, which is inclined below the horizontal and which intersects a first said lateral sub-zone at the level of the striations having circular trajectories in the said first sub-zone, and a horizontal second cut-off half plane intersecting the second lateral sub-zone at the level of the rectilinear vertical striations of the said second sub-zone.

Preferably then, the striations with circular trajectories in the two lateral sub-zones extend symmetrically with respect to a vertical plane passing through the optical axis of the reflector, between a horizontal half plane and an associated transition half plane respectively, and the reflector includes means for mounting the lamp in one of two possible orientations, such that the angular field of the first filament covers respectively two distinct sub-groups of optical elements in the first zone of the reflector, whereby selectively to generate a chopped beam for use in traffic driving on the left and a chopped beam for use in traffic driving on the right.

According to yet another preferred feature of the invention, the lamp is a normalised type "H4" type, the chopped beam is a dipped beam, and the unchopped beam is a main beam.

Preferably, the central sub-zone of the first zone of the reflector provides a greater lateral spread of the light than that provided by the lateral sub-zones of the said first zone, whereby to generate a complex cut-off half profile in the chopped beam.

Further features and advantages of the invention will appear more clearly on a reading of the following detailed description of some preferred embodiments of the invention, given by way of non-limiting example only and with reference to the accompanying drawings.

DESCRIPTION OF PREFERRED EMBODIMENTS OF THE INVENTION

Figure 1:
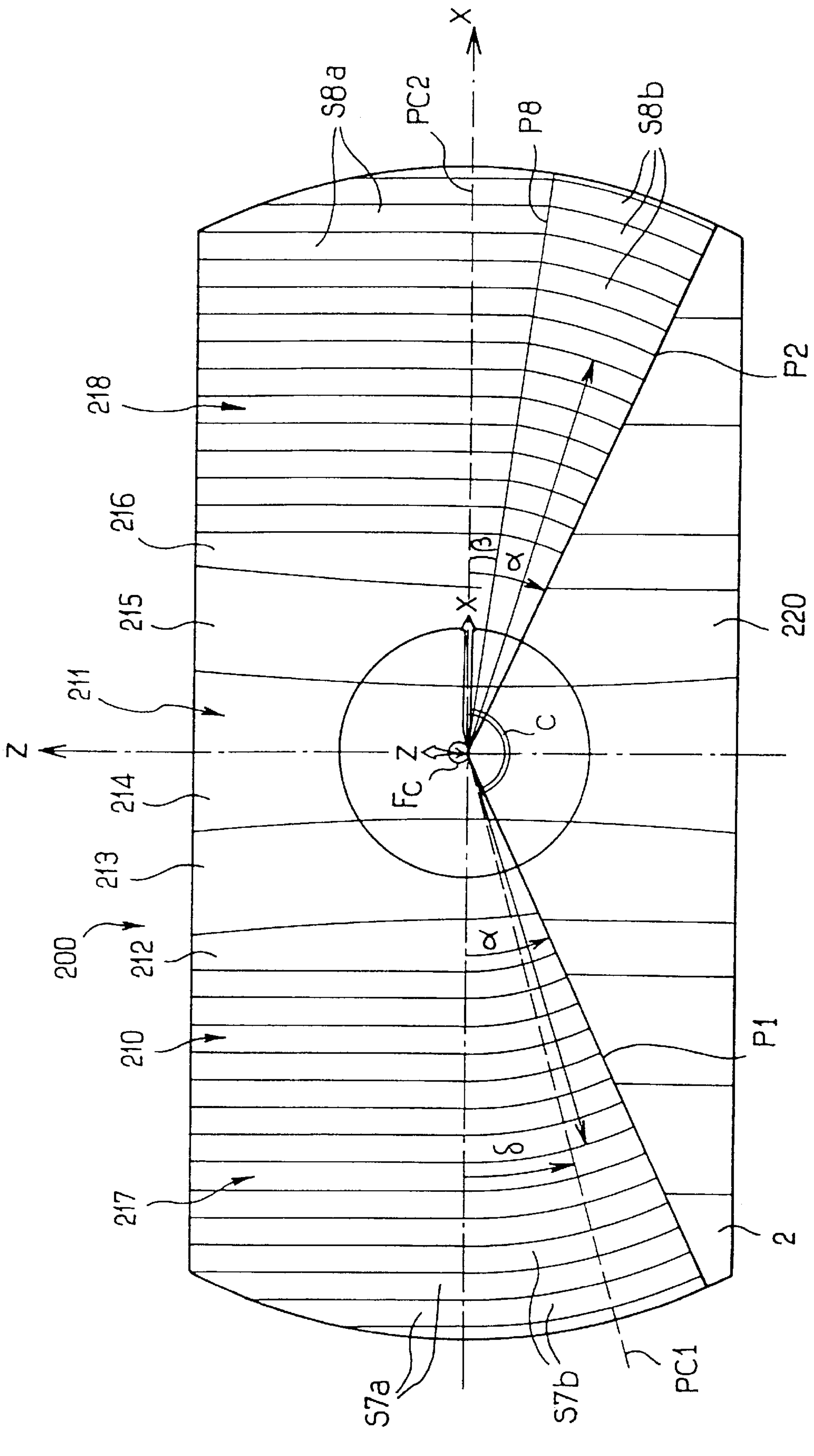
FIG. 1 is a back view of the reflector of a headlight in accordance with the present invention.
Figure 2:
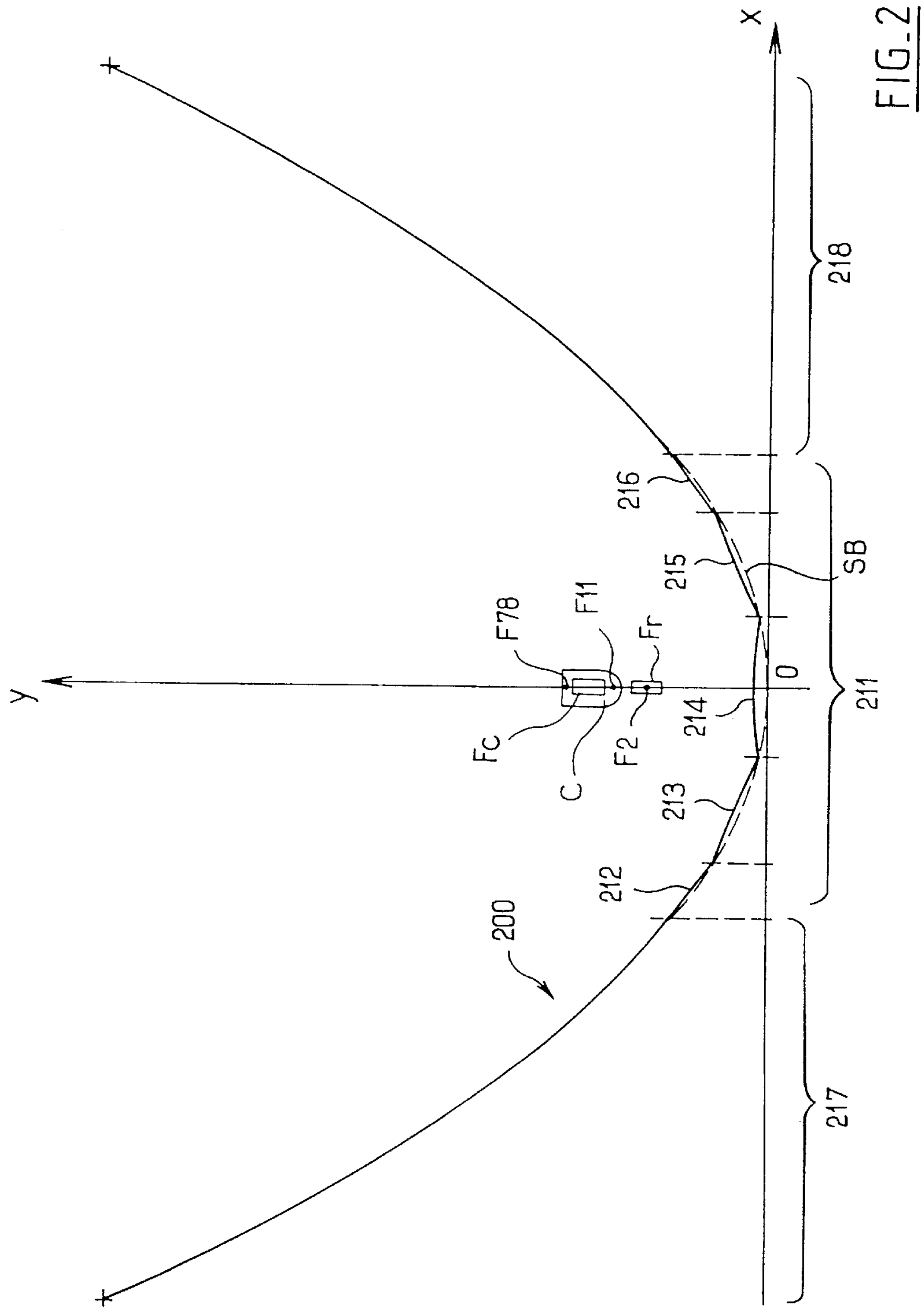
FIG. 2 shows diagrammatically the reflector of FIG. 1, in horizontal axial cross section.

Reference is first made to FIGS. 1 and 2, showing a headlight reflector 200 in which a twin filament lamp is mounted. One of the filaments is a dipped beam filament and is provided with a masking screen. In this example, the lamp is an "H4" normalised lamp, in which the first, or dipped beam filament is denoted Fc and is associated with the masking screen C. The second filament is a main beam filament Fr, which is arranged behind the dipped beam filament and slightly offset downwardly from the latter. No masking screen is associated with the filament Fr.

A lamp of this kind is normally arranged to cooperate with a reflector of generally parabolic form, the focus of which lies somewhere between the filaments. The shape of the masking screen, which extends over approximately 165° around the dipped beam filament Fc, and below the latter, defines a normalised European V-shaped cut-off, with a cut-off elevation angle δ, typically of 15°, which is in the right hand half of the beam where the headlight is intended to be used when driving on the right.

The headlight also includes, in the usual way, a cover lens (not shown) which is essentially smooth or which only deflects light very slightly.

In the reflectors shown in the drawings, in accordance with the present invention, the reflector is not parabolic. Instead, it comprises two main zones 210 and 220 which will be described below.

The first main zone 210 is situated generally in the upper part of the reflector, and is delimited by two axial planes, namely a half plane P1 which is inclined slightly downwardly by an angle denoted α, below the horizontal axial plane X0Y and in the left hand part of the reflector, and a half plane P2 which is in the right hand part of the reflector and which is inclined downwardly by the same angle α below the horizontal axial plane X0Y.

The angle α is chosen to be greater than the cut-off elevation angle δ, and is preferably in the region of 25°. The value of this angle α of inclination of the half planes P1 and P2 ensures that the whole of the radiation from the dipped beam filament Fc lies entirely in the first zone 210 of the reflector.

The second main zone 220 is generally in the lower part of the reflector, and is delimited between the two half planes P1 and P2 as shown in FIG. 1. The zone 220 cooperates only with the main beam filament Fr. By contrast, it will be noted that the other main zone 210 is of course exposed to the light from both filaments.

The zone 210 is sub-divided into three sub-zones, namely a central sub-zone 211 and two lateral sub-zones, namely a left hand sub-zone 217 and a right hand sub-zone 218.

The central sub-zone 211 is preferably constructed from a plurality of elementary regions 212 to 216. More precisely, each of these elementary regions has a horizontal generatrix, that is to say a horizontal axial cross section, which is in the form of a hyperbola, and is constructed in the manner of a surface which automatically generates cut-off, that is to say with defocalisation with respect to the light source Fc such that the images of that light source are essentially aligned below the cut-off. As to the hyperbolic horizontal generatrix, this gives control of the horizontal spread of the light.

Preferably, these various elementary regions 212 to 216 give different amounts of spread below a common horizontal cut-off line which is situated at the height of the horizontal cut-off line for the required dipped beam, in such a way that the various respective components of the beam, produced in the different elements of the sub-zone 211, merge homogeneously into the whole beam.

In addition, the various elementary regions 212 to 216 consist of surfaces which define between them intersections that extend between the upper and lower edges of the reflector; and they are joined one to another along these intersections with a break of slope, that is to say with continuity of zero order only.

The lateral sub-zones 217 and 218 are arranged to complete that part of the beam which is generated by the central sub-zone 211, so as to give the whole beam the appearance required by the regulations. In the present example, this is obtained by forming the sub-zones by projection of clearly defined striations on a base surface.

In accordance with one feature of the invention, it is arranged that, regardless of the type of beam which is to be produced, this base surface is symmetrical with respect to the vertical axial plane Y0Z, for the left hand lateral sub-zone and also for the right hand lateral sub-zone. Preferably, the base surfaces of the two sub-zones 217 and 218 are parts of a common paraboloid of revolution, the focus F78 of which is preferably situated slightly in front of the dipped beam filament Fc. It is particularly preferred that the focus F78 lies about 1 mm in front of the filament Fc, as shown in FIG. 2.

The striations projected on this surface are so designed as to refocus the dipped beam filament Fc. More precisely, given that the paraboloid focussed at F78 as described above produces, by itself, images of the filament which are able to overlap above the cut-off, it is arranged that the striations projected on the sub-zones 217 and 218 give controlled downward deflection of the light. Such deflection is obtained by projecting striations having a level, that is to say a degree of overlap measured along the axis 0Y (FIG. 2) with respect to the base surface, which is larger in the upper region of the striations than in their lower region.

Preferably, these striations provide relatively limited spread of the light, this being obtained by giving them large radii of curvature.

In the present example, which relates to a headlight capable of producing a normalised European dipped beam for driving on the right, a first set of striations S7*a* is arranged in the left hand lateral sub-zone 217, these striations extending vertically between the upper edge of the reflector and the plane of origin X0Y; and a second set of striations S7*b* of circular form centred on the optical axis 0Y and extending in a curve between the plane of origin X0Y and the half plane P1. As can be seen in FIG. 1, the striations S7*b* extend the corresponding striations S7*a* from the level at which the two sets of striations join in the plane of origin X0Y.

Still considering a beam for use when driving on the right, the masking screen C is so arranged that the light from the dipped beam filament Fc meets the left hand lateral sub-zone 217 down to a cut-off plane PC1 which is offset by 15°, about the optical axis 0Y, below the horizontal plane X0Y, that is to say in an intermediate region of the part which includes the circular, or curved, striations S7*b*. In this case, and due in particular to the curvature of the striations S7*b*, it is of course the half plane PC1 produced by the masking screen C that produces the half cut-off, inclined upwardly by 15°, in the right hand half of the beam. This is analogous to the situation with a lamp of the "H4" type or similar, associated with a conventional pure paraboloid of revolution.

As to the right hand lateral sub-zone 218, this also has projected striations, namely a vertical first set of striations S8*a* which extend between the upper edge of the reflector and a half plane P8, which is slightly inclined below the horizontal plane X0Y by an angle of inclination β which is for example 7.5°; and a second set of striations S8*b*, of circular form centred on the optical axis 0Y and extending between the half plane P8 and the half plane P2 defining the transition with the main zone 220.

The striations in the sub-zone 218, like those in the sub-zone 217, are arranged to provide limited spread of the light, as will be seen in detail later in this description. In particular, the dipped beam filament Fc, due to the presence of the masking screen C, cooperates only with that part of the striations S8*a* that lies between the upper edge of the reflector and the horizontal plane X0Y, so as to spread the light horizontally below a horizontal cut-off, while all of the striations S8*a*and S8*b* cooperate with the main beam so as to provide spreading of the light which is mainly horizontal, the circular, or curved, striations S8*b* having a correcting function such as to render the main beam symmetrical while taking into account the deflection performed by the circular striations S7*b* on the opposite side.

It will be noted here that the fact that the vertical striations S8*a* are extended below the horizontal plane X0Y enables the horizontal cut-off to be respected precisely, in spite of the inevitable instances of lack of precision that will occur in relation to the positioning of the masking screen C, and therefore that of the cut-off half plane PC2.

The second main zone 220 of the reflector is not exposed to the light produced by the dipped beam filament Fc, but is exposed only to that from the main beam filament Fr, in such a way that the two main zones 210 and 220 together define a main beam.

The zone 220 consists of a surface which is designed in the same way as the sub-zone 211 of the first main zone 210, except that in this case the various elementary regions of the zone 220 are parabolas and not surfaces that automatically generate cut-off. In addition, the elementary regions situated in the centre of the zone 220 are continuous downward extensions of the respective elementary regions of the central sub-zone 211.

Moreover, for the reasons explained above in connection with the sub-zone 211, the various elementary regions in the zone 220 of the reflector are again joined together with continuity of zero order. However, a discontinuity of zero order may exist along the separating half planes P1 and P2, although these half planes are only exposed to light in main beam operation, so that this discontinuity will give rise to no optical anomaly in the dipped beam.

The optical behaviour of the reflector just described, either in the absence of a cover lens, or with a cover lens which has no optically active elements, is illustrated in FIGS. 3 to 6, to which reference is now made. The projection screen on which the appearance of the various parts of the beam are projected is graduated in degrees in these Figures.

Figure 3A:
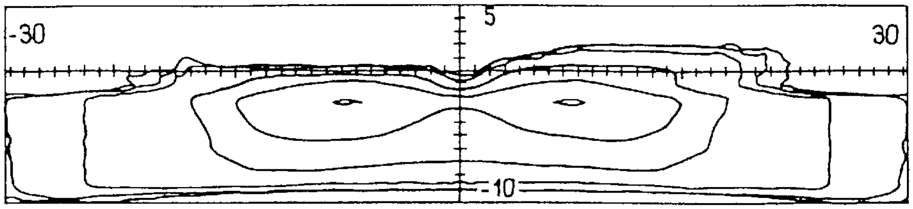
FIGS. 3*a* to 3*c* are three diagrams which show, by sets of isolux curves on a projection screen, the appearance of portions of the headlight beam produced by three respective different portions of the reflector in cooperation with a first filament of the lamp that constitutes the light source of the headlight.

FIG. 3*a* shows the appearance of that part of the beam that is produced by the portion of the central sub-zone 211 which is exposed to the light from the dipped beam filament. It will be noted that there is a very wide lateral spread of the light, but that there is no significant spot of light concentration, as indicated above. Also to be noted are the appearance of the V-shaped cut-off, with depression nearside elevation, i.e. elevation on the right, as is appropriate to a European dipped beam for traffic driving on the right.

Figure 3B:
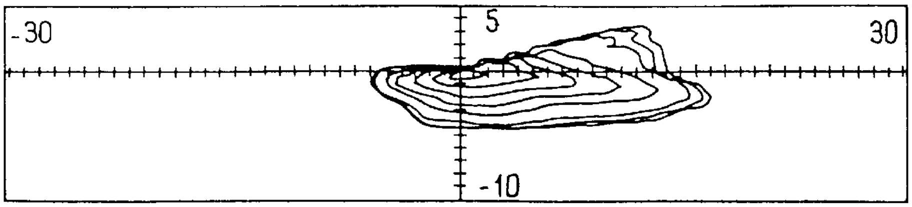

FIG. 3*b* shows the appearance of that part of the beam which is produced by the part of the left hand lateral sub-zone 217 which is exposed to the dipped beam filament, giving an enhanced degree of concentration of light together with limited lateral spread. It will also be noted that the curved striations S7*b* give a good spread of light below the elevated half cut-off on the right.

Figure 3C:
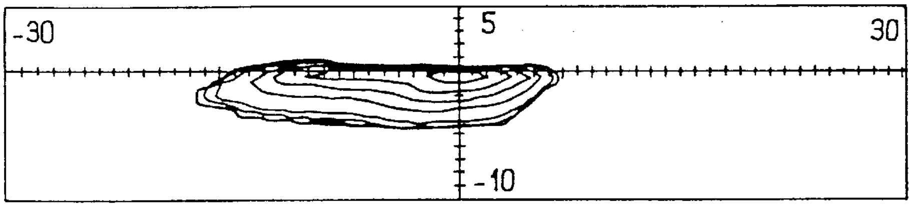
Figure 4:
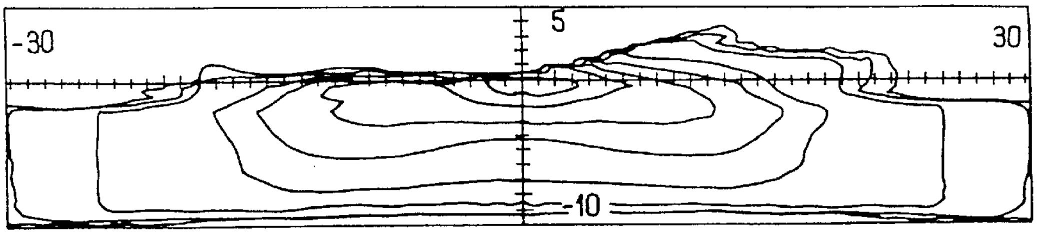
FIG. 4 again consists of a set of isolux curves on a projection screen, and illustrates the appearance of a low, or dipped, beam which is obtained by superimposing on each other those portions of the beam that are shown separately in FIGS. 3*a* to 3*c*.
Figure 5A:
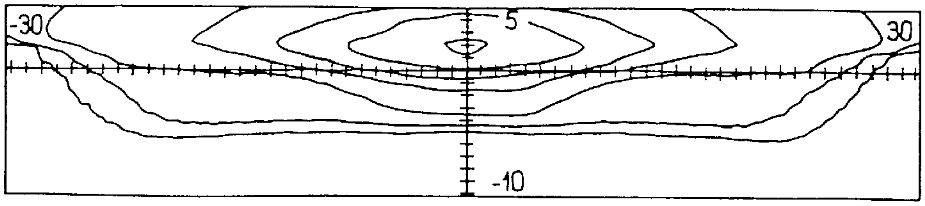
FIGS. 5*a* to 5*d* are four diagrams, each showing a set of isolux curves projected on a screen, and illustrating the appearance of portions of the headlight beam obtained from four respective different portions of the reflector in cooperation with a second filament of the lamp.
Figure 5B:
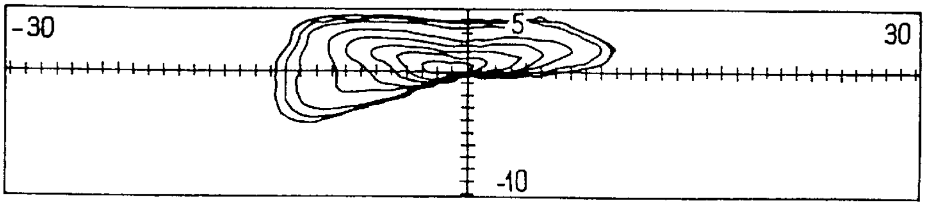
Figure 5C:
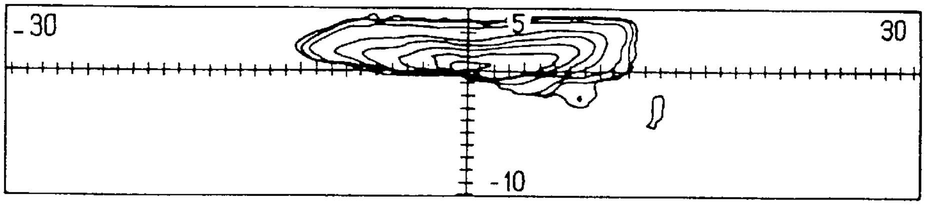
Figure 5D:
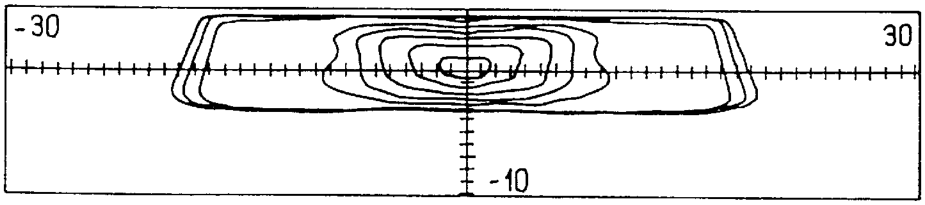
Figure 6:
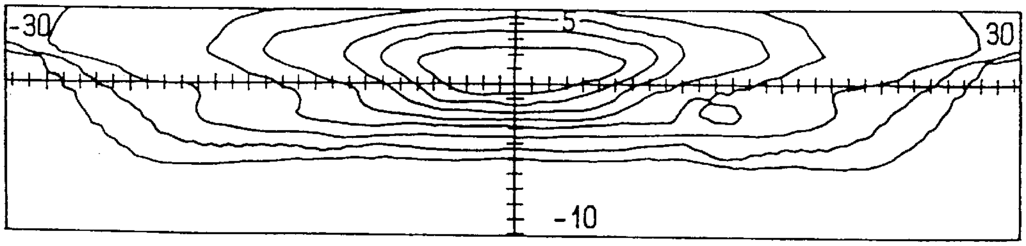
FIG. 6 shows a set of isolux curves illustrating the appearance of a high or main beam of the headlight, obtained by superimposing on each other the portions of the beam shown in FIGS. 5*a* to 5*d*.

As to FIG. 3*c*, this shows the appearance of that part of the beam which is produced by the portion of the right hand lateral sub-zone 218 that is exposed to the light from the dipped beam filament. This shows limited horizontal spread, and positioning of the beam below the horizontal left hand half cut-off line. Finally, the appearance of the whole beam, in which the images shown in FIGS. 3*a* to 3*c* are added together, is seen in FIG. 4.

Reference is now made to FIGS. 5*a* to 5*d*, which show those parts of the beam which are produced respectively by the central sub-zone 211, the left hand lateral sub-zone 21 7, the right hand lateral sub-zone 218 and the main zone 220, when the main beam filament is in use. In particular, it will be observed in FIGS. 5*b* and 5*c* that there is some degree of symmetry between the parts of the beam produced by the lateral sub-zones 217 and 218, due to the circular striations in those two sub-zones.

If FIGS. 3*a*, 3*b* and 3*c* are studied in particular, it will be understood that it is possible, while preserving the same base surfaces for all the zones of the reflector, to produce dipped beams, or other chopped beams such as fog penetrating beams, simply by suitable choice of values for the parameters of the various sets of striations.

Essentially, the preservation of the base surfaces enables the same mould cavity to be used (and more precisely a common mould cavity whether the headlight is intended for use when driving on the left or on the right) for making reflectors suitable for producing all of these different types of beams.

In addition, in the particular example described above, FIG. 4 shows that the dipped beam obtained can be suitable for compliance both with European regulations (for driving on the right) and with American regulations. More precisely, attention is drawn to the right hand side of FIG. 4, which shows the presence of the half cut-off elevated by about 15° over a certain width, and the presence beyond this elevated portion of an extension of the cut-off in the form of a plateau which is slightly offset in height with respect to the left hand horizontal half cut-off.

The invention enables this effect to be obtained by the combination of: firstly, the heavily striated central sub-zone 211, the portion of which lying between the plane X0Y and the first cut-off half plane PC1 generates the right hand half plateau as shown in FIG. 3*a*; and secondly, the lateral sub-zone 217, in particular at the level of the circular striations S7*b*, which generate the right hand elevated cut-off portion as shown in FIG. 3*b*.

That implies that, in order to make a headlamp with main and dipped beam functions for use with European traffic driving on the right, and a headlamp with the same functions for American traffic, it is possible to use for each headlight (i.e. both the left hand light and the right hand light of the vehicle), not only the same mould cavity but also the same mould former (or male member) cooperating with the mould cavity, and this leads to substantial economy in tooling costs.

It is useful to recall here that, in modern methods of making reflectors, these are made by injection of mouldable synthetic materials into moulds which comprise a fixed cavity defining the posterior face of the reflector, and a movable former, or male mould component, which will define its anterior face, on which a varnish and a reflective metalisation coating are subsequently successively applied.

Figure 7A:
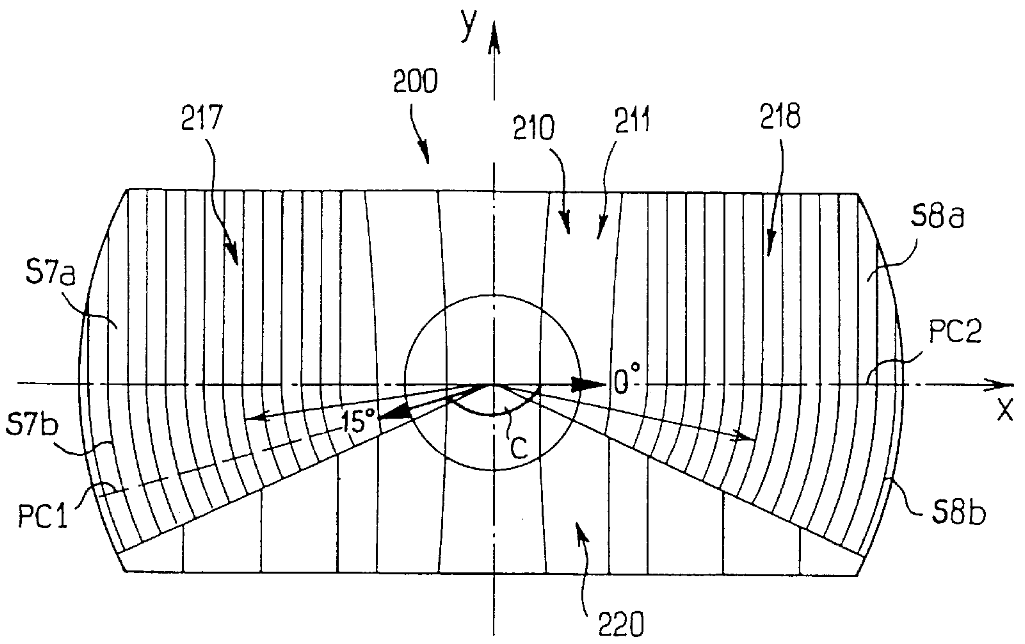
FIG. 7*a* is a back view of a headlight reflector used for producing a headlight beam in a vehicle with left hand drive, i.e. for driving on the right.
Figure 7B:
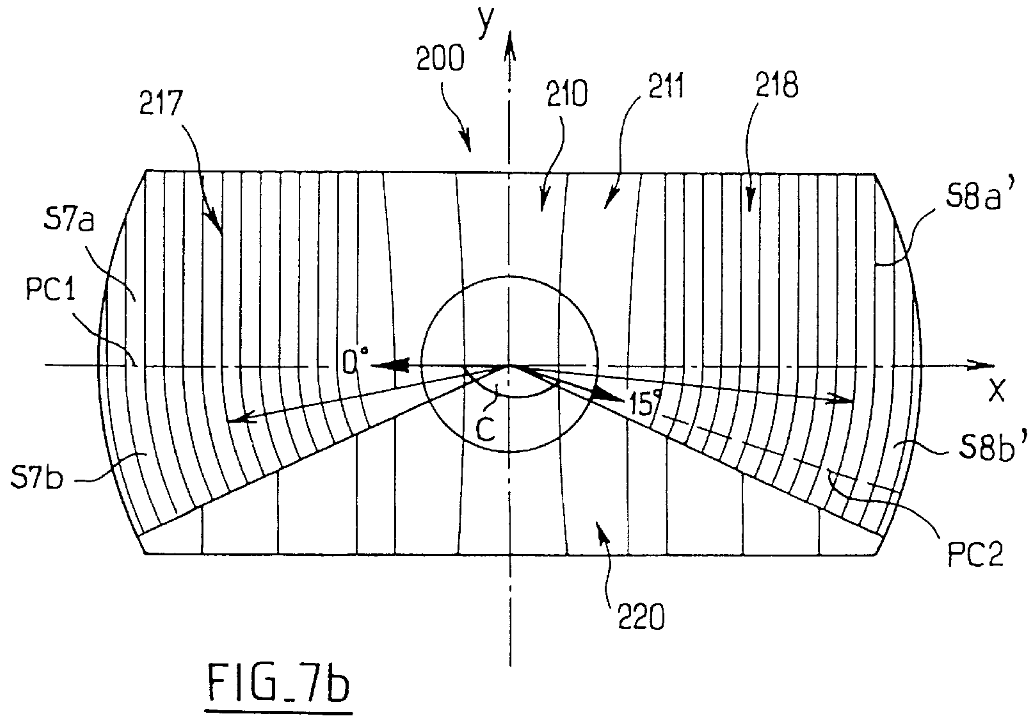
FIG. 7*b* is a back view of a reflector which is identical with that shown in FIG. 7*a*, except that it is adapted for a vehicle with right hand drive, i.e. for driving on the left hand side of the road.

Reference is now made to FIGS. 7*a* and 7*b*, which show a modified embodiment of the invention. With this version, the same mould cavity and the same male mould component can be used, not only for making reflectors for headlights having a main beam function and a dipped beam function for European and American traffic for driving on the right, but also for reflectors for headlights intended for driving on the left, in Europe or elsewhere.

In this embodiment, the central sub-zone 211 and the main zone 220 of the reflector are made as described above. However, the lateral sub-zones 217 and 218, which remain established on symmetrical parabolic base surfaces, here consist of sets of striations, S7*a*, S7*b* and S7*a*', S7*b*' respectively, which are fully symmetrical with respect to the vertical axial plane Y0Z. In particular, the curved striations S7*b*, of circular form, are identical to those described above with reference to FIG. 1, while the curved striations S8*b*' are, similarly, circular striations centred on the optical axis 0Y and extending between the horizontal plane X0Y and the transition half plane P2.

In the case shown in FIG. 7*a*, the lamp, which is of the "H4" normalised type, is oriented in the same way as in FIG. 1, this Figure showing a headlight mirror for main and dipped beams for use with European traffic driving on the right, but being equally suitable for American traffic as has been seen above.

In the case shown in FIG. 7*b*, the same lamp, i.e. the light source, is simply turned clockwise through 15°, so as to move the cut-off planes PC1 and PC2 to the new positions shown. In this case, for obvious reasons of symmetry it will be understood that the headlight thereby becomes, without any other modification, a headlight with a main beam function and a dipped beam function suitable for use in traffic driving on the left, for example under the appropriate European regulations.

Thus in this embodiment, manufacture of the headlight reflectors calls only for one mould cavity and one former for the left-hand headlight of the vehicle, and one corresponding set of mould parts for its right-hand headlight. In this connection, in some very special cases, it will be realised that the reflectors of the left and right hand headlights of the vehicle may sometimes be identical, and this enables a single common set of mould components, to be used for both headlights of the vehicle.

The present invention is of course not limited to the embodiments described above and shown in the drawings, and a person familiar with this technical field will be able to apply any variation or modification within the spirit of the invention. In particular, the invention can be applied to any other type of headlight which includes a lamp having two filaments, one of which is associated with a mask, with a view to producing, selectively, a chopped beam and a beam which is not chopped.

Finally it will be observed that the reflector designed in accordance with the present invention may have, in some zones, optical surfaces in which the striations are superfluous. In that case, decorative striations may be provided in such zones, that is to say striations which play no part in the optics of the headlight, but which give the reflector a homogeneous appearance.

What is claimed is:

1. A motor vehicle headlight comprising:

a light source having a first filament for producing a chopped beam and a second filament for forming an unchopped beam, the light source being such that the second filament can emit light freely around the second filament;

a masking screen associated with the first filament, defining a cut-off for the chopped beam limiting emission of light by the first filament to a given angular field;

a cover lens in front of the light source and reflector, the cover lens being substantially without any light deflecting capability; and a reflector defining an optical axis of the reflector, wherein a horizontal plane and a vertical plane contain the optical axis, the mirror further defining two transition half planes extending close to the optical axis and inclined to the horizontal plane and lying slightly within the region cut-off from the first filament by the masking screen, with the transition half planes being below the horizontal plane by the same amount as each other, the reflector comprising:

an upper zone of the reflector, bounded by the transition half planes, the upper zone comprising two lateral sub-zones, each lateral sub-zone having a base surface and a reflective surface applied on the base surface, the base surfaces of the lateral sub-zones being symmetrical with respect to the vertical plane, each reflective surface comprising striations projected on the corresponding base surface, the reflective surfaces to the two lateral sub-zones defining two respective components of the chopped beam; and a second zone in the remainder of the reflector, having a reflective surface for cooperation with the second filament only and being adapted to generate a beam portion which is wide and which extends at least partly above the cut-off.

2. A headlight according to claim 1, wherein the upper zone of the reflector further includes a central sub-zone flanked on each side by a respective lateral sub-zone, the central sub-zone comprising a plurality of elementary regions, each elementary region having a horizontal axial cross section unfocussed on the second filament, each elementary region being joined to the next along an intersection having a break of slope.

3. A headlight according to claim 2, wherein the central sub-zone is joined to the lateral sub-zones of the upper zone with continuity of zero order.

4. A headlight according to claim 1, wherein the base surfaces of the lateral sub-zones in the upper zone of the reflector define a common paraboloid of revolution having an axis coincident with the optical axis.

5. A headlight according to claim 4, wherein the reflector defines a focal point immediately in front of the first filament, the paraboloid of revolution being focussed on the focal point.

6. A headlight according to claim 4, wherein the striations in each lateral sub-zone comprise rectilinear and substantially vertical striations for spreading light horizontally, and curved striations disposed below the rectilinear striations and being configured as arcs of coaxial circles centered in the vicinity of the optical axis.

7. A headlight according to claim 6, wherein the reflector defines a first cut-off half plane inclined below the horizontal and intersecting a first lateral sub-zone at the level of the curved striations of the first sub-zone, the reflector further defining a horizontal second cut-off half plane intersecting the second lateral sub-zone at the level of the rectilinear striations of the second sub-zone, the masking screen defining an angular field of emission between the first and second cut-off half planes.

8. A headlight according to claim 7, wherein the curved striations of the first lateral sub-zone are symmetrical with the curved striations in the second lateral sub-zone with respect to the vertical plane, the reflector defining, in the horizontal plane, a horizontal half plane associated with a respective transition half plane, with each set of curved striations extending between the corresponding horizontal half plane and transition half plane, a mounting site of the reflector configured to mount the light source selectively in two possible orientations such that the angular field of the first filament covers, respectively, two distinct sub-groups of optical elements of the upper zone, one sub-group of optical elements adapted for operation in traffic driving on the left, and one sub-group adapted for operation in traffic driving on the right.

9. A headlight according to claim 1, wherein the light source is a standard "H4" lamp, the chopped beam being a dipped beam and the unchopped beam being a main beam.

10. A headlight according to claim 3, wherein the central sub-zone of the upper zone of the reflector is adapted to give greater lateral spread of the emitted light than the lateral sub-zones, and to generate a complex cut-off half profile in the chopped beam.

11. A reflector for a motor vehicle headlight, comprising:

a mounting site for stabilizing high and low beam filaments and a masking screen in relation to the reflector, the masking screen partially obscuring light emitted from the low beam filament;

upper and lower zones, being separated by transition lines symmetrically depressed below horizontal and slightly within the shadow cast over the low beam light by the masking screen, the transition lines meeting at an optical axis of the reflector, the upper and lower zones being designed to achieve a desired distribution of light without further deflection by a cover lens;

the upper zone of the reflector comprising two lateral sub-zones, the reflecting surfaces of the lateral sub-zones being bilaterally symmetrical about the vertical plane containing the optical axis, each reflective surface comprising striations configured to chop a beam emitted from a low beam filament; and a second zone in the remainder of the reflector, having a reflective surface for cooperation with the second filament only and being adapted to generate a beam portion which is wide and which extends at least partly above the cut-off.

12. A headlight according to claim 11, wherein the upper zone of the reflector further includes a central sub-zone flanked on each side by a respective lateral sub-zone, the central sub-zone comprising a plurality of elementary regions, each elementary region having a horizontal axial cross section unfocussed on the high beam filament, each elementary region being joined to the next along an intersection having a break of slope.

13. A headlight according to claim 12, wherein the central sub-zone is joined to the lateral sub-zones of the upper zone with continuity of zero order.

14. A headlight according to claim 11, wherein the base surfaces of the lateral sub-zones in the upper zone of the reflector define a common paraboloid of revolution having an axis coincident with the optical axis.

15. A headlight according to claim 14, wherein the reflector defines a focal point immediately in front of the low beam filament, the paraboloid of revolution being focussed on the focal point.

16. A headlight according to claim 14, wherein the striations in each lateral sub-zone comprise rectilinear and substantially vertical striations for spreading light horizontally, and curved striations disposed below the rectilinear striations and being configured as arcs of coaxial circles centered in the vicinity of the optical axis.

17. A headlight according to claim 16, wherein the curved striations of the first lateral sub-zone are symmetrical with the curved striations in the second lateral sub-zone with respect to the vertical plane, the corresponding pairs of curved and rectilinear striations meeting along a horizontal line through the optical axis, the mounting site configured to mount the light source selectively in two possible orientations such that the light distribution from the low beam filament covers, respectively, two distinct sub-groups of optical elements of the upper zone, one sub-group of optical elements configured for operation in traffic driving on the right, and one sub-group configured for operation in traffic driving on the left.

18. A headlight according to claim 11, wherein the low beam and high beam filaments are filaments of a standard H4 lamp.

19. A headlight according to claim 13, wherein the central sub-zone of the upper zone of the reflector is adapted to give greater lateral spread of the emitted light than the lateral sub-zones, and to generate a complex cut-off half profile in the chopped beam.

* * * * *